(12) United States Patent
Schwark

(10) Patent No.: US 11,988,766 B2
(45) Date of Patent: May 21, 2024

(54) INTERFERENCE MITIGATION IN AN FMCW RADAR SYSTEM

(71) Applicant: GM Cruise Holdings LLC, San Francisco, CA (US)

(72) Inventor: Christoph Schwark, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 340 days.

(21) Appl. No.: 17/356,469

(22) Filed: Jun. 23, 2021

(65) Prior Publication Data

US 2022/0397638 A1    Dec. 15, 2022

(30) Foreign Application Priority Data

Jun. 15, 2021  (EP) .................................... 21179613

(51) Int. Cl.
*G01S 7/02* (2006.01)
*G01S 7/40* (2006.01)
*G01S 13/34* (2006.01)
*G01S 13/931* (2020.01)

(52) U.S. Cl.
CPC ............ *G01S 7/023* (2013.01); *G01S 7/4056* (2013.01); *G01S 13/34* (2013.01); *G01S 13/931* (2013.01)

(58) Field of Classification Search
CPC .......... G01S 7/023; G01S 7/4056; G01S 13/34
See application file for complete search history.

(56) References Cited

U.S. PATENT DOCUMENTS

| 10,048,350 | B1 | 8/2018 | Piao et al. | |
|---|---|---|---|---|
| 2008/0231496 | A1* | 9/2008 | Sakamoto | G01S 7/354 |
| | | | | 342/159 |
| 2017/0010344 | A1* | 1/2017 | Corbett | G01S 7/023 |
| 2017/0293025 | A1* | 10/2017 | Davis | G01S 7/023 |
| 2020/0124699 | A1* | 4/2020 | Meissner | G01S 13/0209 |
| 2020/0284874 | A1 | 9/2020 | Narayana Moorthy et al. | |
| 2021/0190901 | A1* | 6/2021 | Izadian | G01S 7/0235 |
| 2022/0011423 | A1* | 1/2022 | Li | G01S 7/023 |
| 2022/0349985 | A1* | 11/2022 | Zhang | G01S 13/343 |

FOREIGN PATENT DOCUMENTS

CN          115561746 A      1/2023

OTHER PUBLICATIONS

"European Search Report for European Patent Application No. 21179613.1", dated Dec. 8, 2021, 6 pages.
"Communication Under Rule 71(3) EPC for European Patent Application No. 21179613.1", dated Sep. 28, 2023, 42 pages.

* cited by examiner

*Primary Examiner* — Marcus E Windrich
(74) *Attorney, Agent, or Firm* — CALFEE, HALTER & GRISWOLD LLP

(57) ABSTRACT

Technologies are described herein that are configured to identity detections output by a frequency-modulated continuous-wave (FMCW) radar system that are caused by an interfering signal. The detections are detected as being caused by an interferer based upon numbers of detections assigned to bins in a velocity-direction histogram.

20 Claims, 8 Drawing Sheets

INTERFERENCE MITIGATION IN AN FMCW RADAR SYSTEM

RELATED APPLICATION

This application claims priority to European Patent Application No. EP21179613.1, filed on Jun. 15, 2021. The entirety of this application is incorporated herein by reference.

BACKGROUND

Radar systems are being employed in autonomous vehicles (AVs) to identify and track objects that are within a sensing range of the radar systems (e.g., between 1 meter and 250 meters). A radar system is configured to generate detections within respective temporal detections windows, where each detection corresponds to a point in the environment of the radar system (that is within a range of the radar system) where the radar system ascertains that a target exists. Therefore, the radar system, for each detection, identifies a location for the detection relative to the radar system. In addition, the radar system is configured to compute a respective velocity value for each detection (e.g., a velocity of the target relative to the radar system) and is further configured to compute a respective direction value for each detection (e.g., a direction of the target relative to the radar system).

An example type of radar system is a frequency-modulated continuous-wave (FMCW) radar system, where an FMCW radar system is configured to transmit an FMCW signal that includes FMCW chirps into the environment. The FMCW radar system is further configured to detect radar signals having a frequency within a predefined spectrum; when a detected radar signal includes a reflection of an FMCW chirp off of a target, the radar system outputs a detection based upon a difference between a frequency of the LO and a frequency of the detected radar signal over time, wherein a distance from the radar system to the target is based upon the difference between the frequency of the LO and the frequency of the detected radar signal. With more specificity, the radar system generates detections based upon the detected radar signal being downmixed with a local oscillator (LO), where the LO, in an example, corresponds to the emitted FMCW signal. The radar system can compute a velocity for a detection based upon phase of the downmixed signal and can employ beamforming technologies to compute a direction for the detection. For a temporal detection window, the radar system can generate numerous detections (where the number of detections may depend upon the range of the radar system, number of transmit and receive antennas, and other factors).

As more and more AVS traverse roadways, and as radar systems become increasingly ubiquitous, it is contemplated that a FMCW radar system may generate erroneous detections that are caused by radar emitters emitting radar signals into the environment (rather than detections that are caused by FMCW chirps reflecting from a target). Put differently, the radar system may output data that indicates that a target exists at a location in the environment, when in reality there is no target at that location.

There are several conventional approaches for identifying a detected radar signal as being emitted by an interferer and/or avoiding detection of an interfering signal. For example, when the radar system is an FMCW radar system, the radar system can employ interference nulling to detect FMCW chirps emitted by an interferer (e.g., another radar system). Interference nulling, however, has several drawbacks, including the dismissal of information that may be useful from output of an analog to digital converter (ADC). In addition, when using interference nulling, it may be difficult to detect an interfering signal in a raw data stream. Another conventional approach is to randomly vary modulation parameters of the FMCW radar system (e.g., modify phase of FMCW chirps). However, this introduces additional circuitry and processing complexities. To avoid detecting an interfering signal, an FMCW radar system can employ frequency hopping when emitting the FMCW signal, such that the radar system can emit a first FMCW chirp within a first baseband spectrum and later emit a second FMCW chirp within a second baseband spectrum (to avoid an interfering signal with a frequency within the first baseband spectrum). Frequency hopping, however, also introduces additional processing complexities and requires use of additional bandwidth.

SUMMARY

The following is a brief summary of subject matter that is described in greater detail herein. This summary is not intended to be limiting as to scope of the claims.

Described herein are various technologies pertaining to labeling detections generated by a frequency-modulated continuous wave (FMCW) radar system as being caused by an interfering signal (a radar signal emitted from an emitter) rather than being caused by a reflection of an FMCW signal emitted by the radar system. The radar system is configured to generate an FMCW signal that includes FMCW chirps and emit such FMCW signal into an environment of the radar system. The radar system additionally generates a local oscillator (LO) that corresponds to the emitted FMCW signal. Within a temporal detection window, the radar system generates several detections (e.g., in 2-dimensional space or 3-dimensional space), where each detection is generated based upon a downmixed signal that is created by downmixing the LO with a radar signal detected by the radar system. Hence, the several detections represent points in the scene where the radar system has determined that one or more targets exist.

The radar system is configured to compute, for the detections, respective velocity values and direction values. A velocity value for a detection represents a computed velocity of a target perceived to be in the scene by the radar system. A direction value for the detection represents a computed direction of the target perceived to be in the scene by the radar system relative to the radar system. As mentioned above, the detection, however, may be caused by an interferer (that emits a continuous wave (CW) radar signal) rather than a reflection of the FMCW signal, and therefore there may be no target in the scene that corresponds to the detection.

The radar system is further configured to perform velocity gating and direction gating for the detections based upon the velocity values and direction values computed for the detections. With more particularity, the radar system may be able to compute velocities in a range between a first value and a second value (e.g., between 0 m/s and 64 m/s). The radar system may perform gating operations to place a computed velocity within one of a discrete number of non-overlapping gates, where a gate represents a sub-range in the range. Therefore, when a velocity of 54.2343 m/s for a detection, the radar system may assign the detection to a velocity gate that covers the sub-range 54 m/s-55 m/s. The radar system undertakes a similar process for directions that are computed for detections (e.g., detections are assigned to direction gates).

The radar system constructs a velocity-direction (multi-dimensional) histogram for each temporal detection window based upon the velocity gates and the direction gates, where the histogram includes numerous non-overlapping bins, with each bin corresponding to a respective velocity gate and a respective direction gate. For instance, when there are 64 velocity gates and 64 direction gates, the velocity-direction histogram includes 4096 bins (e.g., [VG1, BG1], [VG2, BG1] [VG3, BG1], . . . [VG63, BG64], [VG64, BG64]). Detections that are assigned to the same velocity gate and the same direction gate are assigned to the same bin in the velocity-direction histogram.

The radar system uses the histogram to identify detections that are caused by interfering signal(s) during the temporal detection window. With more specificity, the radar system is configured to identify detections that are caused by interfering signal(s) during the temporal detection window based upon numbers of detections assigned to bins in the histogram. With yet more specificity, and as will be described in greater detail herein, the radar system is configured to determine a number of detections assigned to each bin and is further configured to determine a number of detections assigned to bins that are neighbors of the bin in the histogram. The radar system identifies detections that are caused by interfering signal(s) based upon the number of detections assigned to the bin and the aggregate number of detections assigned to the neighboring bins. This is possible due to the radar system generating detections based upon a downmixing of a local oscillator (LO) (that includes FMCW chirps) and a detected signal; when the detected signal is a continuous wave (CW) signal, the downmixed signal includes chirps in the baseband spectrum of the radar system, with the chirps having similar phase shifts. When a Fast Fourier Transform is performed on these chirps, energy exists with respect to a wide range of distances along a single direction. Additionally, the similar phase shifts indicate a constant velocity—therefore, when there are a large number of detections that have the same velocity and direction, these detections are likely caused by an interfering signal.

In some embodiments, the radar system is configured to employ numerous thresholds to identify detections that are caused by an interfering signal (rather than a reflection of a FMCW signal). In an example, the radar system is configured to determine a number of detections in a bin in the histogram and is further configured to compare the number of detections with a first threshold to ascertain whether detections in the bin are possibly caused by an interfering signal. When the number of detections is greater than the first threshold, the radar system is configured to compare the number of detections with a second (higher) threshold. When the number of detections in the bin is greater than the second threshold, the radar system labels each detection assigned to the bin as being caused by an interfering signal, such that the detections can be filtered from output data. When the number of detections is less than the second threshold (but greater than the first threshold), the radar system is configured to compare the number of detections assigned to the bin with an aggregate number of detections assigned to bins that are neighbors of the bin (e.g., where bins that are neighbors can be identified a priori).

When a difference between the number of detections assigned to the bin and the aggregate number of detections assigned to the neighbor bins is above a threshold, each detection assigned to the bin can be labeled as being caused by an interfering signal. Further, when an aggregate number of detections assigned to bins that are extended neighbors of the bin is beneath a threshold (e.g., there are a sparse number of detections with similar velocities and directions), detections assigned to neighbor bins can each be labeled as being caused by the interfering signal. The radar system, subsequent to labeling the detections as being caused by the interfering signal, can filter such detections from output data, such that output data generated by the radar system (and transmitted to, for example, a computing system of an autonomous vehicle for further processing) fails to include the detections labeled as being caused by the interfering signal. In an example, an autonomous vehicle performs a driving maneuver based upon the output data generated by the radar system (with the detections labeled as being caused by the interfering signal filtered therefrom).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
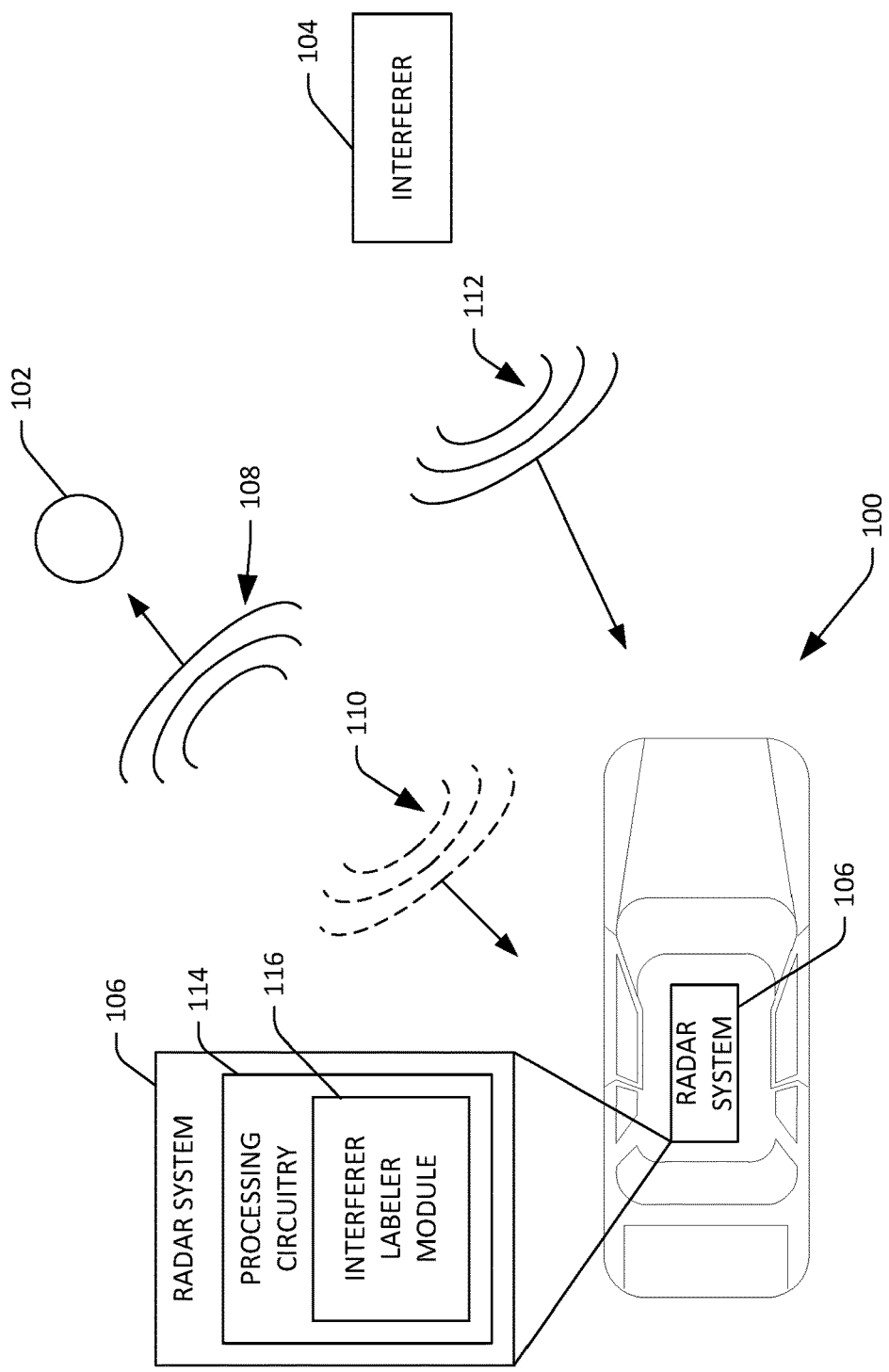
FIG. 1 is a schematic that illustrates an autonomous vehicle (AV) having a frequency-modulated continuous-wave (FMCW) radar system of an autonomous vehicle, where the radar system is configured to identify detections caused by an interfering signal.

Various technologies pertaining to a frequency-modulated continuous-wave (FMCW) radar system that is configured to label detections as being caused by an interfering signal (such as a continuous wave (CW) signal) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

A FMCW radar system that is configured to identify detections generated by the radar system that are caused by an interfering signal (rather than a FMCW signal emitted by the radar system and reflecting off of a target) is described herein. The radar system is configured to identify detections that are caused by an interfering signal through use of a velocity-direction histogram. As will be described in greater detail herein, the radar system assigns each detection to bin from amongst a plurality of bins in a velocity-direction histogram, where the radar system assigns the detection to the bin based upon a velocity assigned to the detection and one or more directions assigned to the detection. The radar system is configured to count numbers of detections assigned to bins in the histogram and is further configured to label detections as being caused by an interfering signal based upon the numbers of detections assigned to the bins in the histogram. The radar system described herein is an improvement over conventional radar systems, as (unlike a radar system that employs interference nulling) the radar system can identify detections caused by an interfering signal. Additionally, the radar system need not randomly alter modulation parameters to identify detections caused by an interfering signal; moreover, the radar system need not modify the baseband frequency of FMCW signals emitted by the radar system to identify detections caused by an interfering signal.

Referring now to FIG. 1, a schematic depicting an autonomous vehicle 100 navigating in an environment is illustrated. In the example depicted in FIG. 1, the environment surrounding the autonomous vehicle (AV) 100 includes a target 102 (such as a telephone pole, a pedestrian, an automobile, a building, or any other suitable object that may be in the environment with the AV 100). In addition, the environment includes an interferer 104, where the interferer 104 emits an interfering radar signal in the environment. For example, the interferer 104 is a radar system coupled to another vehicle (e.g., another AV). Further, the interfering signal may be a continuous wave (CW) radar signal having a frequency between 76 and 81 GHz.

The AV 100 includes a radar system 106, where the AV 100 performs driving maneuvers based upon output of the radar system 106. The radar system 106 is a FMCW radar system that emits a FMCW signal that includes numerous chirps into the environment. The radar system 106 detects return signals that have frequencies in a frequency spectrum that encompassed frequencies in the chirps emitted by the radar system 106. A chirp includes an up-chirp and/or a down-chirp, where during an up-chirp frequency of the FMCW signal increases (e.g., linearly) with time and during a down-chirp frequency of the FMCW signal decreases (e.g., linearly) with time. The radar system 106 emits a FMCW radar signal 108 that includes chirps into the environment and toward the target 102. A return signal 110 is detected by the radar system 106, where the return signal 110 is a reflection of the radar signal 108 from the target 102. The radar system 106 generates detections based upon the return signal 110.

As further illustrated in FIG. 1, the interferer 104 emits an interfering signal 112, where the interfering signal 112 signal travels towards the radar system 106. The radar system 106 detects the interfering signal 112 and generates detections based upon the interfering signal.

With more specificity pertaining to the radar system 106 generating detections, the radar system 106 generates a local oscillator (LO); in an example, the LO corresponds to the emitted FMCW signal 108. The radar system 106 detects a radar signal and downmixes the detected radar signal with the LO, thereby forming a downmixed signal. When the detected signal is a reflection of the emitted FMCW signal off of the target 102, the frequency of the downmixed signal represents distance between the radar system 106 and the target 102, and the radar system 106 generates a detection that corresponds to the target. When the detected signal is the interfering signal, however, the downmixed signal includes frequency chirps rather than a relatively constant frequency; when a Fast Fourier Transform is performed on the downmixed signal, energy is spread over numerous distances, and therefore the radar system 106 generates several detections. The detections, however, do not correspond to any target in the environment.

The radar system 106 includes processing circuitry 114 that is configured to generate detections based upon the LO and detected radar signals and is further configured to assign values to the detections, such as range values, velocity values, and direction values. As will be described below, the processing circuitry 114 is also configured to perform velocity gating and direction gating for the detections. The processing circuitry 114 includes an interferer labeler module 116 that is configured to identify detections generated by the processing circuitry 114 that are caused by an interfering signal (e.g., the interfering signal 112 emitted by the interferer 104) and is further configured to label such detections as being caused by the interfering signal. With respect to gating, and in regard to velocity values, the processing circuitry 114 can be configured to compute velocities for detections accurately within a particular range (e.g., 0 m/s to 50 m/s). The processing circuitry 114 can partition the range into non-overlapping gates, where each gate corresponds to a sub-range of the range, and where the gates collectively cover the range. For instance, the range can be divided into 50 sub-ranges, with each sub-range covering a 1 m/s sub-range. It is to be understood, however, that the gates need not cover equivalent sub-ranges, and that more or fewer than 50 gates are contemplated. The processing circuitry 114 performs similar processing when performing direction gating (where the direction gating may be in two dimensions or three dimensions). Thus, a detection is assigned a velocity gate and one or more direction gates based upon a velocity value computed for the detection and a direction value computed for the detection.

The interferer labeler module 116 is configured to construct a (two-dimensional) velocity-direction histogram based upon the velocity gates and direction gates referenced above. For instance, when there are 64 velocity gates and 64 direction gates, the histogram includes 4096 bins (e.g., (e.g., [VG1, BG1], [VG2, BG1] [VG3, BG1], . . . [VG63, BG64], [VG64, BG64]). The interferer labeler module 116 assigns detections to bins in the histogram based upon velocity gates and direction gates assigned to the detections. Therefore, detections having the same velocity gates and direction gates assigned thereto are in turn assigned to a same bin in the histogram. Contrarily, two detections that have different velocity gates and/or direction gates assigned thereto are assigned to two different bins in the histogram by the interferer labeler module 116.

The interferer labeler module 116 labels detections as being caused by an interfering signal based upon numbers of detections assigned to bins in the histogram. As will be described in greater detail below, the interferer labeler module 116 can utilize various thresholds to determine whether detections assigned to a bin are caused by an interfering signal. In other embodiments, the interferer labeler module 116 can employ machine learning technologies in connection with identifying detections that are caused by an interfering signal. For example, a neural network (such as a deep neural network (DNN), a recurrent neural network (RNN), etc.) can be provided with the histogram and can identify detections caused by an interfering signal based upon numbers of detections assigned to bins in the histogram. More specifically, the machine learning technologies can be trained with labeled training data, where the labeled training data includes histograms and labels assigned to detections in the histograms that indicate whether or not the detections were caused by interfering signals.

Figure 2:
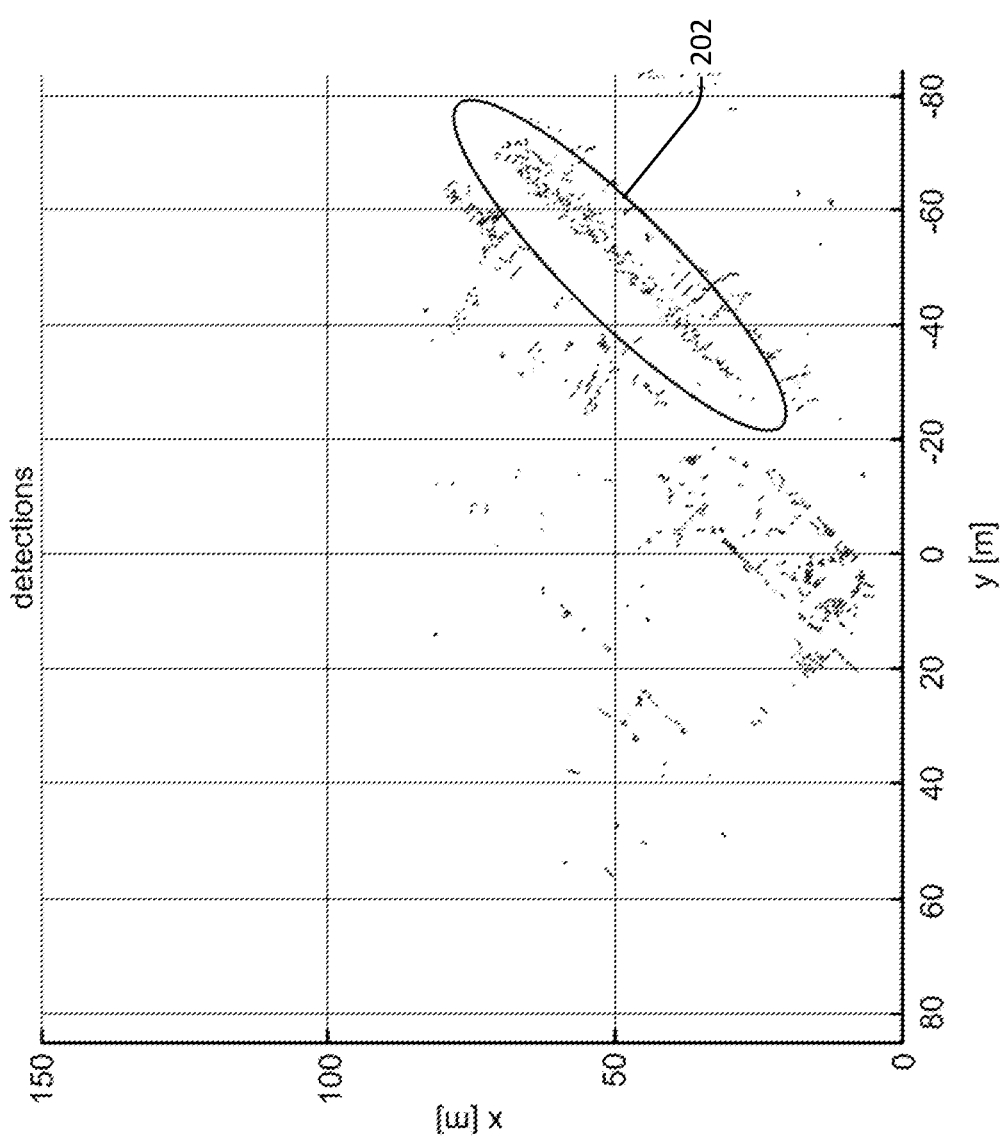
FIG. 2 is a plot of example detections generated by a FMCW radar system.

Referring now to FIG. 2, a plot 200 depicting detections generated by the radar system 106 (prior to filtering detections caused by the interfering signal 112 emitted by the interferer 104) during a temporal detection window is presented. As noted previously, these detections represent points in space relative to the radar system 106 where the radar system 106 believes that an FMCW signal emitted by the radar system 106 has reflected from a target and returned to the radar system 106. In actuality, however, the detections illustrated in the region 202 of the plot 200 are caused by an interfering signal, and thus do not represent a target or targets in the environment. As noted above, the radar system 106 assigns velocity values to each of the detections illustrated in the plot 200. When the interfering signal 112 emitted by the interferer 104 is a CW signal, for example, a group of detections located at a direction relative to the radar system 106 and having similar velocities is generated by the radar system 106 (e.g., the detections in the region 202 caused by the interfering signal have similar velocities). That the detections have a same/similar directions and same/similar velocities is an effect of analog mixing of a local oscillator signal with, for example, a CW interfering signal.

Figure 3:
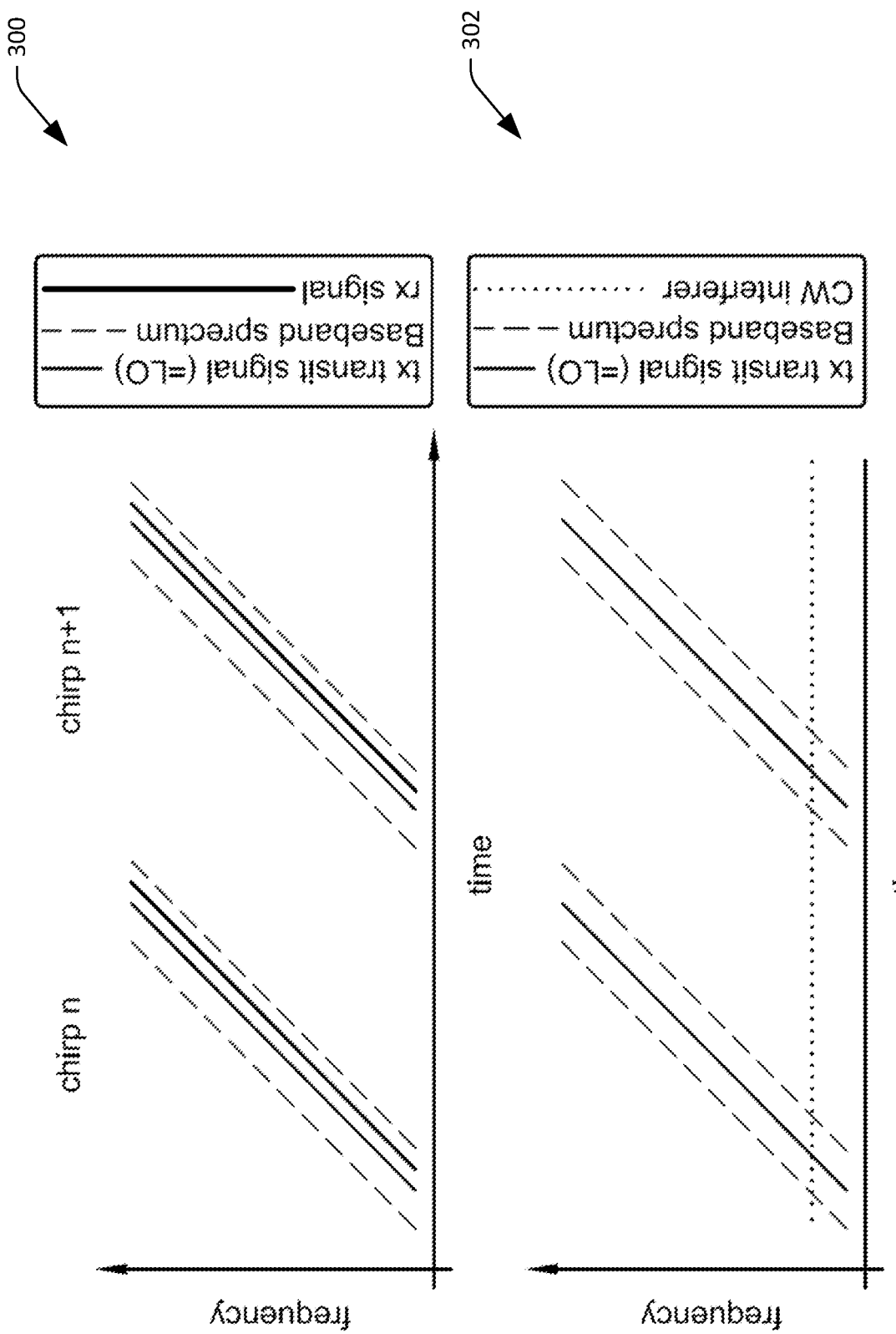
FIG. 3 illustrates two plots that depict a local oscillator (LO) relative to a reflected signal and a continuous wave (CW) interfering signal with respect to time.

FIG. 3 depicts a pair of plots 300 and 302. The first plot 300 illustrates a pair of chirps (chirp n and chirp n+1) emitted by the radar system 106 into the environment (where the emitted chirp is also the LO). The first plot 300 also illustrates a radar signal detected by the radar system 106, where the detected radar signal is a reflection of the emitted chirps. It can be ascertained that the reflections of the chirps detected by the radar system 106 have frequencies that are included in the baseband spectrum and that are offset from the chirps in time. Therefore, when the LO is downmixed with the received radar signal, a constant value over a majority of a length of the chirp is obtained (where the constant value is the difference between the frequencies of the emitted chirp and the frequencies of the detected chirp over time).

Contrarily, the second plot 302 illustrates an emitted FMCW signal emitted by the radar system 106, where the FMCW signal includes a pair of chirps. The second plot 302 also illustrates an interfering CW signal emitted by the interferer 104. Downmixing of the LO with the interfering CW signal leads to a downmixed signal that includes chirps in the baseband spectrum. A Fast Fourier Transform (FFT) performed over the downmixed signal leads to the radar system 106 generating numerous detections that have a wide range of distances. Additionally, in the chirps in the downmixed signal, phase shift is the same from chirp to chirp, indicating a constant velocity across the generated detections. As will be described in greater detail below, these features allow for differentiation between detections associated with reflected return signals and detections caused by an interfering signal.

Figure 4:
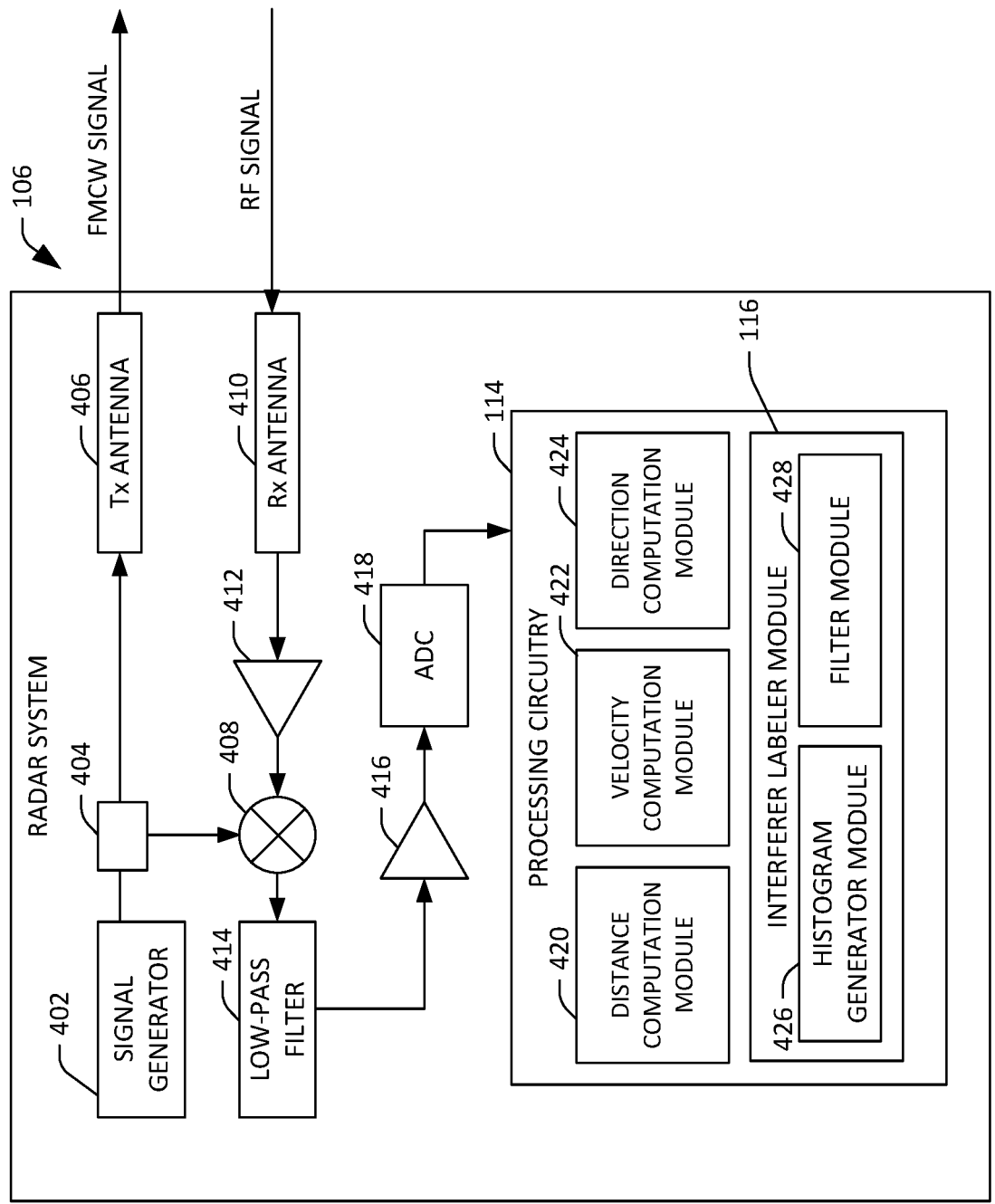
FIG. 4 is a schematic that depicts a radar system that is configured to identify detections that are caused by an interfering signal.

Referring now to FIG. 4, a functional block diagram of the radar system 106 is illustrated. The radar system 106 includes a signal generator 402 that generates an FMCW signal that includes numerous chirps. A power divider 404 receives the FMCW signal and splits the FMCW signal (e.g., duplicates the FMCW signal). The radar system 106 also includes a transmit antenna 406 that receives a first instance of the FMCW signal from the power divider 404 and emits the first instance of the FMCW signal into an environment of the radar system 106. The radar system 106 further includes a downmixer 408, where the downmixer 408 receives a second instance of the FMCW signal from the power divider 404. The first instance of the FMCW signal has higher power then the second instance of the FMCW signal, as the power of the first instance of the FMCW signal must be sufficient enough to allow for the transmit antenna 406 to transmit the FMCW signal into the environment with sufficient power to allow for detections to be made within a desired range.

The radar system 106 further includes a receive antenna 410 that detects a radar signal from the environment of the radar system 106. The detected radar signal can be or include a reflection of the FMCW signal emitted by the transmit antenna 406 (upon the FMCW signal reflecting from a target in the environment of the radar system 106). Additionally, the detected radar signal can be or include an interfering signal emitted from the interferer 104. While the radar system 106 is illustrated as including a transmit antenna 406 and a receive antenna 410, it is understood that the radar system 106 includes several transmit antennas and several receive antennas, such that beamforming can be undertaken.

An amplifier 412 is operably coupled to the receive antenna 410 and amplifies the detected signal as output by the receive antenna 410, thus outputting an amplified signal. The downmixer 408 is electrically coupled to the amplifier 412, and downmixes the LO output by the power divider 404 with the amplified signal output by the amplifier 412. The downmixer 408 outputs a downmixed analog signal that represents differences in frequency over time between the LO and the amplified signal output by the amplifier 412.

The radar system 406 also includes a low pass filter 414 that is electrically coupled to the downmixer 408. The low pass filter is 414 configured to filter higher frequencies from the downmixed signal and output a filtered signal, where the filtered signal includes frequencies that are included in the baseband spectrum. A second amplifier 416 is optionally electrically coupled to the low pass filter 414, where the second amplifier 416 amplifies the filtered signal output by the low pass filter 414. The radar system 406 also includes an analog to digital converter (ADC) 418 that receives the amplified signal output by the second amplifier 416 and converts such signal into a digital signal.

The radar system 106 further includes the processing circuitry 114, where the processing circuitry 114 is configured to receive the digital signal output by the ADC 418. In an example, the processing circuitry 114 is a digital signal processor (DSP). In other examples, the processing circuitry 114 is or includes a central processing unit (CPU), an application specific integrated circuit (ASIC), a field-programmable gate array (FPGA), a graphics processing unit (GPU), a micro-controller, or other suitable processing circuitry.

The processing circuitry 114 includes a distance computation module 420, a velocity computation module 422, and a direction computation module 424. The processing circuitry 114 generates detections for the environment based upon the digital signal output by the ADC 418. The distance computation module 420 is configured to compute distances for the detections relative to the radar system 106 and is further optionally configured to perform range gating. The velocity computation module 422 is configured to compute velocities for the detections and is further configured to perform velocity gating for the detections. The direction computation module 424 is configured to compute directions relative to the radar system 106 for the detections and is further configured to perform direction gating for the detections.

With more specificity, the radar system 106 is configured to detect some range of velocities unambiguously; such range can be partitioned into some number (e.g., 64) of discrete, nonoverlapping gates, and the velocity computation module 422 can assign each detection to a velocity gate based upon the velocity assigned to the detection by the velocity computation module 422. Similarly, the radar system 106 is configured to unambiguously detect some range of directions. This range of directions can be divided into e.g., 64 discrete, nonoverlapping gates, and each detection is assigned to the appropriate direction gate based upon the direction computed for the detection by the direction computation module 424.

The processing circuitry 114 further includes the interferer labeler module 116 that is configured to identify and label detections that are caused by the interfering signal (e.g., emitted by the interferer 104), such that the labeled detections can be filtered. To that end, the interferer labeler module 116 includes a histogram generator module 426 that constructs a velocity-direction histogram based upon the velocity and direction gates, as described above. The histogram generator module 426 assigns detections to bins in the histogram based upon the velocity gates and the direction gates to which the detections have been assigned. Thus, detections assigned to a same bin in the histogram are each assigned to the same velocity gate and the same direction gate by the velocity computation module 422 and the direction computation module 424, respectively.

Figure 5:
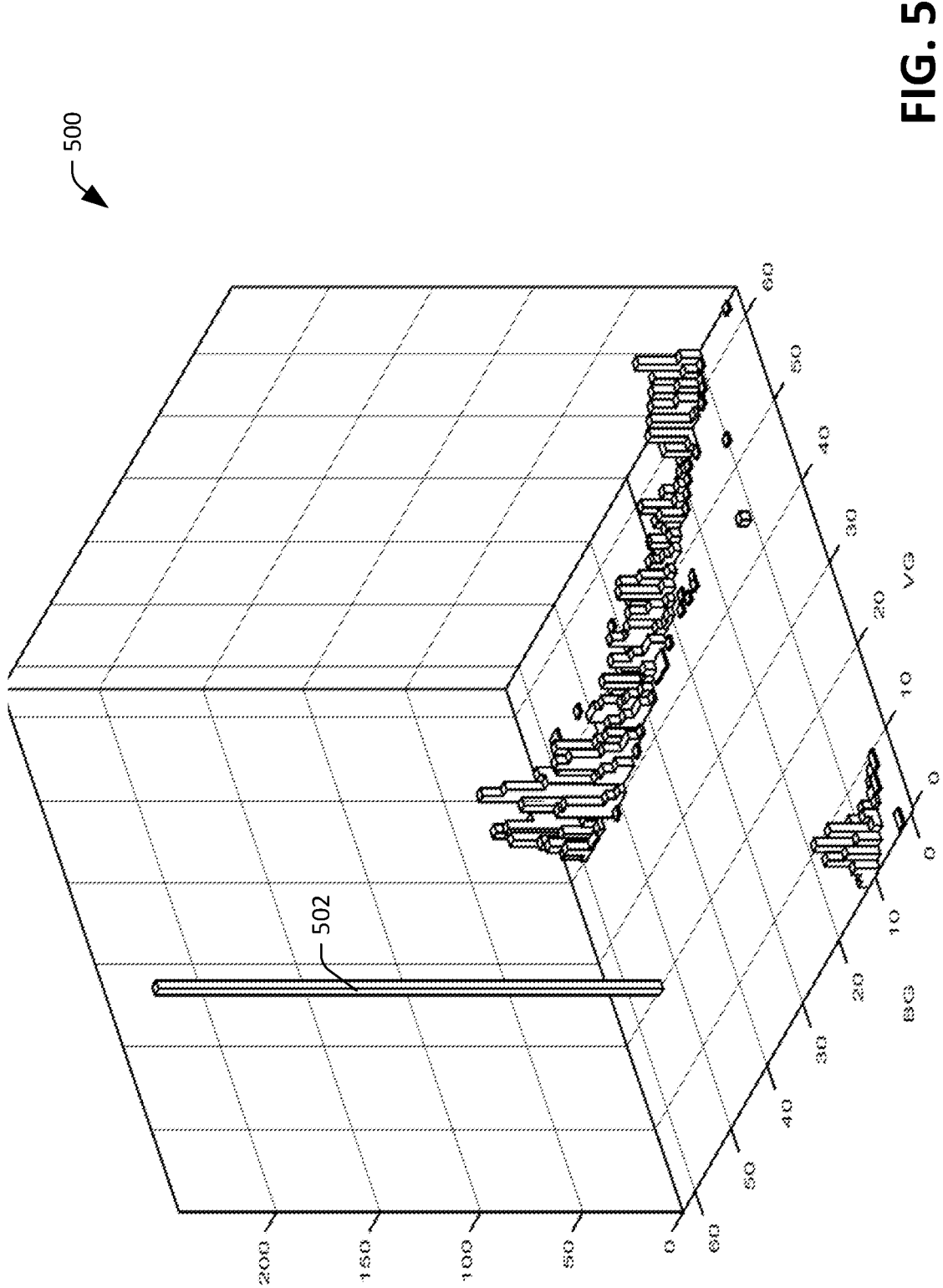
FIG. 5 is an example velocity-direction histogram.

Turning briefly to FIG. 5, an example velocity-direction histogram 500 is illustrated. Height of a bin in the histogram 500 represents a number of detections that are assigned to the bin in the histogram 500 within the temporal detection window. Thus, as illustrated by height of a bin 502, there are a relatively large number of detections assigned to the bin 502 in the histogram 500.

Returning to FIG. 4, the interferer labeler module 116 further includes a filter module 428 that is configured to label detections as being caused by an interfering signal and is also configured to filter such detections from output data generated by the radar system 106. Generally, the filter module 428 is configured to count numbers of detections in bins of the histogram and label detections as being caused by an interfering signal based upon the numbers of detections in the bins.

Figure 6:
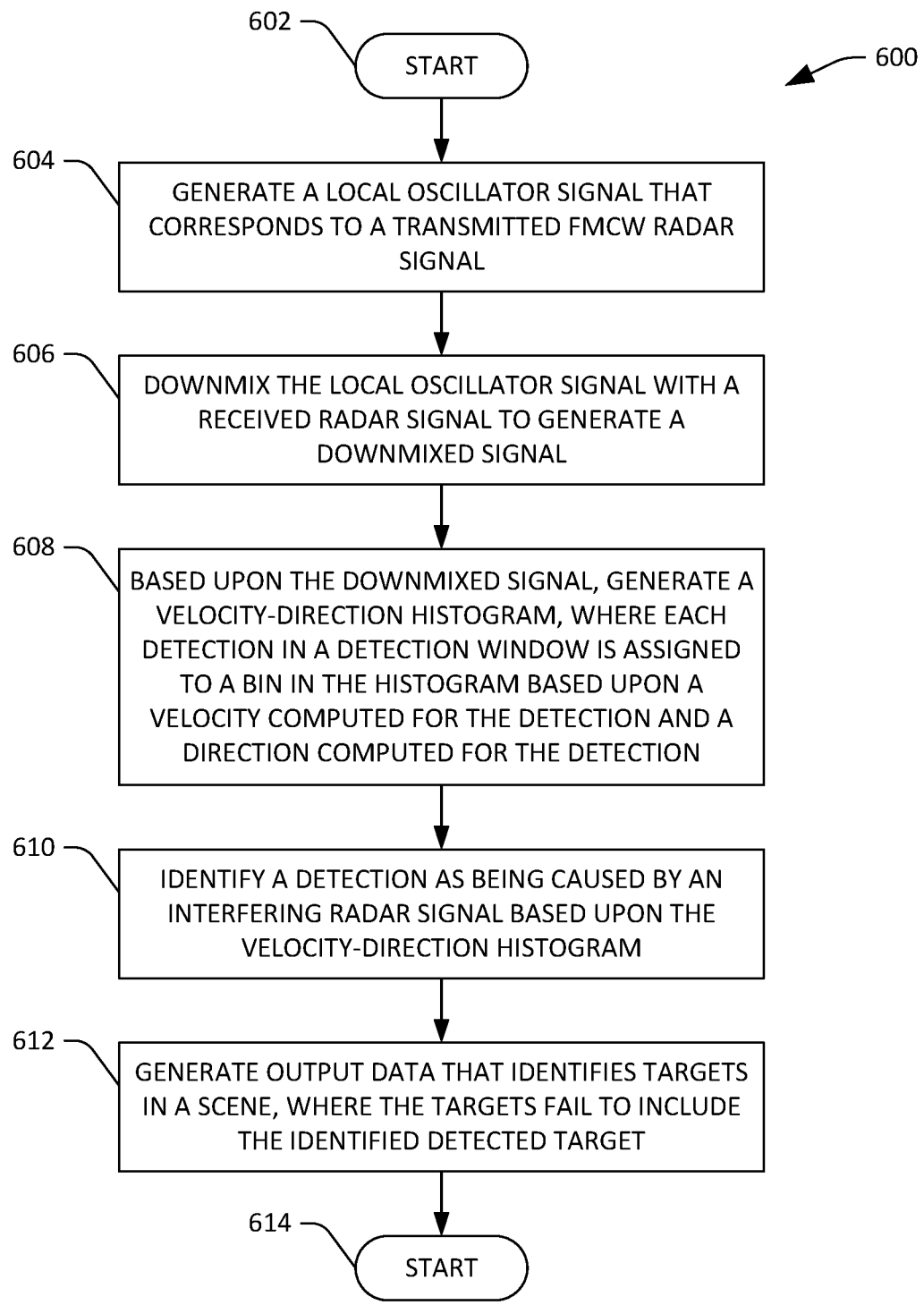
FIG. 6 is a flow diagram that illustrates a methodology for identifying that detections generated by a FMCW radar system are caused by an interfering signal.
Figure 7:
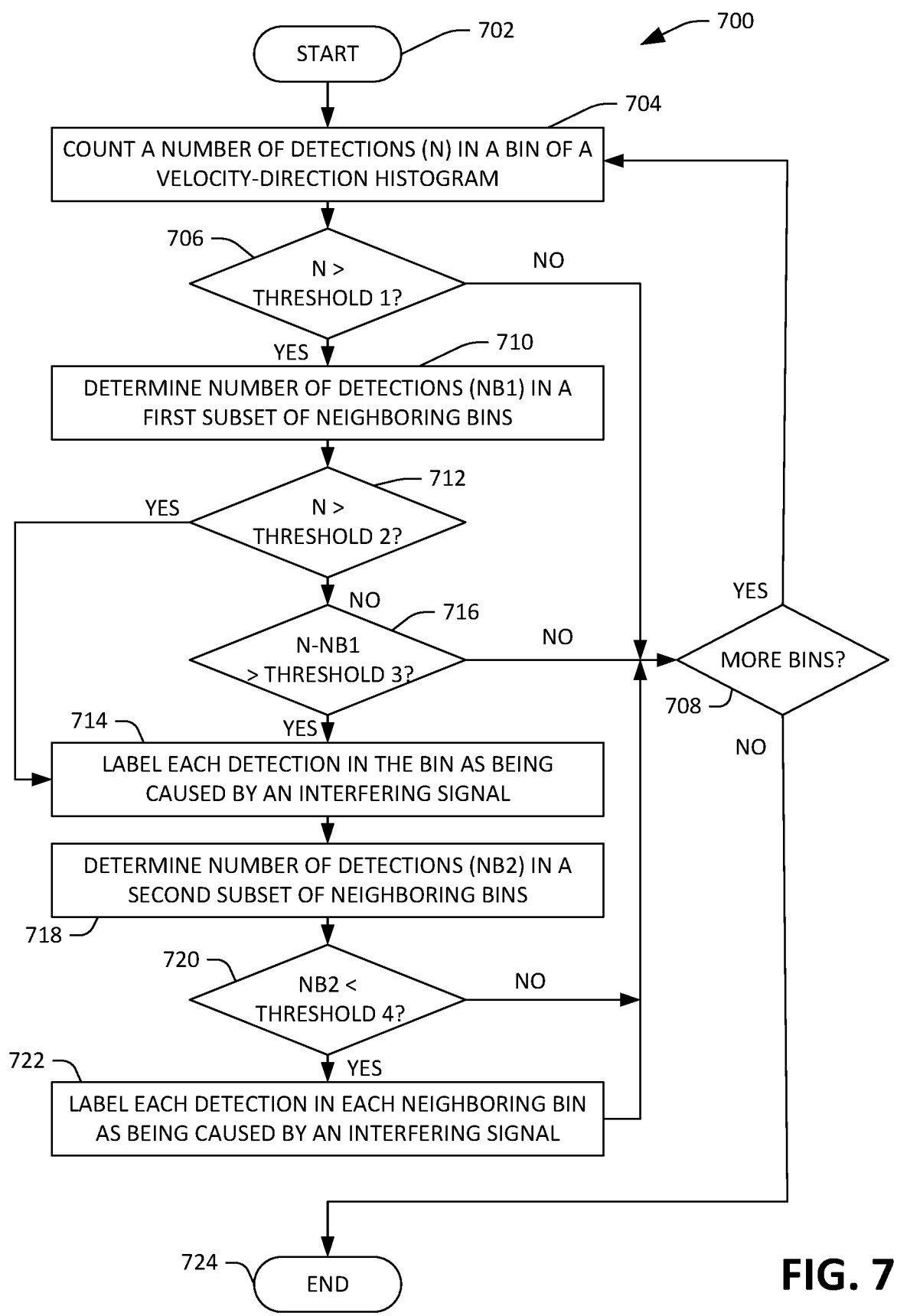
FIG. 7 is a flow diagram that illustrates a methodology for labeling detections generated by a FMCW radar system as being caused by an interfering signal.

Referring to FIGS. 6 and 7, methodologies that are performed by the radar system 106 are illustrated. While the methodologies are shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, some of the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring solely to FIG. 6, a methodology 600 performed by the radar system 106 in connection with labeling detections as being caused by an interfering signal and filtering such detections from output data is illustrated. The methodology 600 starts at 602, and at 604 a LO signal is generated that corresponds to a transmitted FMCW radar signal (where the FMCW radar signal includes several chirps). At 606, the LO signal is downmixed with a received radar signal to generate a downmixed signal. At 608, based upon the downmixed signal, a velocity-direction histogram is generated, where each detection in a temporal detection window is assigned to a bin in the histogram based upon a velocity computed for the detection and a direction computed for the detection. As indicated previously, velocity gating and direction gating can be performed in connection with binning the detections in the velocity-direction histogram.

At 610, a detection is identified as being caused by an interfering radar signal (e.g., an interfering CW radar signal) based upon the histogram. At 612, output data is generated that identifies detections for a scene, where the detection labeled as being caused by the interfering signal is not included or otherwise represented in the output data. The methodology 600 completes at 614.

Referring now to FIG. 7, a flow diagram illustrating a methodology 700 that is performed by the filter module 428 in connection with labeling detections as being caused by an interfering signal is illustrated. The methodology 700 starts at 702, and at 704 a bin is selected from the histogram, and a number of detections (N) in the bin of the histogram is counted. At 706, a determination is made as to whether N is greater than a first predefined threshold (threshold 1). If N is not greater than the first predefined threshold, the methodology 700 proceeds to 708, where a determination is made as to whether there are more bins to process. When it is determined at 708 that there are more bins to process, the methodology 700 returns to 704, where another bin in the histogram is selected and a number of detections in the selected bin is counted.

When it is determined at 706 that N is greater than the first predefined threshold, the methodology 700 proceeds to 710, where a number of detections (NB1) in a first subset of neighboring bins to the selected bin is determined. Bins that are neighboring bins to the selected bin may be defined based upon a mode of operation of the radar system 106. In an example, the neighboring bins are bins in the histogram that are immediately adjacent to the selected bin. In another example, the first subset of neighboring bins may include the neighboring bin that with a second highest count from amongst all neighboring bins and the neighboring bin with a fourth highest count from amongst all neighboring bins. Bins to include in the first subset of neighboring bins can be ascertained empirically.

At 712, a determination is made as to whether N is greater than a second predefined threshold (threshold 2), where the second threshold is higher than the first threshold. When N is greater than the second predefined threshold, the methodology 700 proceeds to 714, where each detection in the bin is labeled as being caused by an interfering signal. When N is not greater than the second threshold, the methodology 700 proceeds to 716, where a determination is made as to whether N exceeds NB1 by a third predefined threshold. In an example, the third threshold can be equivalent to the first threshold. When it is determined at 716 that a difference between N and NB1 exceeds the third threshold, the methodology 700 proceeds to 714, where each detection in the bin is labeled as being caused by an interfering signal. When it is determined at 716 that a difference between N and NB1 fails to exceed the threshold, the methodology proceeds to 708, where the determination is made as to whether there are more bins to select.

Upon each detection in the bin being labeled as being caused by an interfering signal at 714, the methodology 700 proceeds to 718, where a number of detections (NB2) in a second subset of neighboring bins is determined. As with the first subset of neighboring bins, bins included in the second subset of neighboring bins can be ascertained empirically. At 720, a sparsity check is made. With more specificity, a determination is made as to whether there are a sparse number of detections that surround the bin that has been identified as corresponding to an interfering signal. At 720, a determination is made as to whether NB2 is less than a fourth predefined threshold. When NB2 is not less than the fourth threshold, the methodology 700 proceeds to 708. When it is determined at 720 that NB2 is less than the fourth threshold, then the methodology 700 proceeds to 722, where each detection in each of the neighboring bins is identified as being caused by an interfering signal. This can happen due to imperfections in velocity gating and/or direction gating, as velocities proximate to gate boundaries may fall into different gates.

Upon each detection in each neighboring bin being labeled as being caused by an interfering signal, the methodology 700 returns to 708, where the determination is made as to whether there are more bins to process. When there are no more bins to process, the methodology 700 ends at 724.

With respect to the methodology 700, the thresholds can be determined empirically and may be different depending upon the radar system employed, the mode of the radar system, etc. Furthermore, bins in the histogram are viewed as periodic.

While the methodology 700 has been described as using thresholds to identify detections that are caused by an interfering signal, it is to be understood that other approaches are contemplated. For instance, as referenced above, machine learning technologies can be employed, where a machine learning algorithm is provided with the velocity-direction histogram as input, and the machine learning algorithm outputs an indication as to which detections are caused by interfering signals based upon the contents of the histogram.

Figure 8:
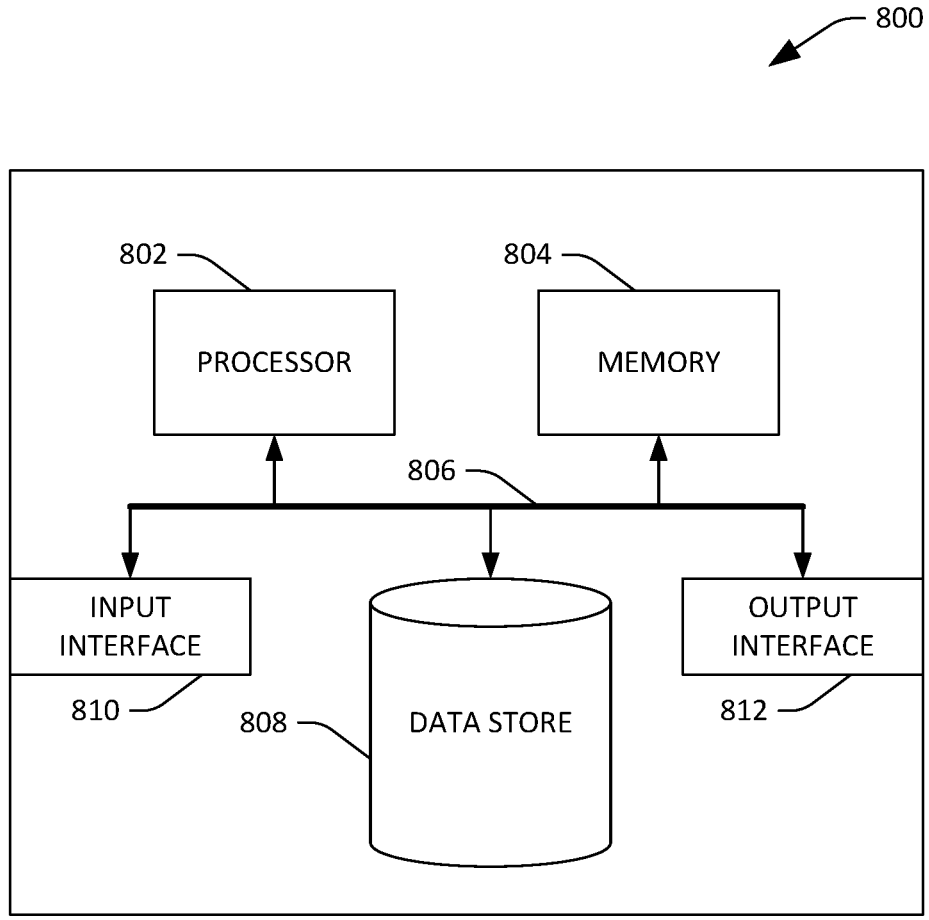
FIG. 8 is a computing system that may be included in a radar system and/or autonomous vehicle (AV).

Referring now to FIG. 8, a high-level illustration of an exemplary computing device 800 that can be used in accordance with the systems and methodologies disclosed herein is illustrated. For instance, the computing device 800 may be used in a system that is configured to control a mechanical system of an autonomous vehicle. By way of another example, the computing device 800 can be used in a system that is configured to identify detections that are caused by interfering signal(s). The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store cross-correlation outputs, ultrasonic sensor outputs, calibration settings, parameters etc.

The computing device 800 additionally includes a data store 808 that is accessible by the processor 802 by way of the system bus 806. The data store 808 may include executable instructions, thresholds, histograms, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The features described herein relate to identifying detections that are caused by an interfering signal according to at least the examples provided below.

(A1) In one aspect, some embodiments include a method performed by processing circuitry of a radar system of an AV, where the method includes computing, for a temporal detection window and based upon a frequency-modulated continuous wave (FMCW) signal emitted by the radar system: 1) a velocity for a detection in a scene; and 2) a direction of the detection relative to the radar system. The method also includes generating a velocity-direction histogram for the detection window, wherein the velocity-direction histogram comprises bins, and further wherein the detection is assigned to a bin in the bins based upon the velocity assigned to the detection and the direction of the detection relative to the radar system. The method further includes identifying the detection as being caused by an interfering signal based upon a number of detections assigned to the bin in the velocity-direction histogram for the detection window. The method additionally includes generating, based upon the FMCW signal, output data that identifies detections in the scene, wherein the detections identified in the output data fail to include the detection identified as being caused by the interfering signal, wherein the AV performs a driving maneuver based upon the output data.

(A2) In some embodiments of the method of A1, velocities and directions are computed for several detections in the temporal detection window based upon the FMCW signal, wherein the several detections are assigned to respective bins in the velocity-direction histogram for the temporal detection window.

(A3) In some embodiments of the method of A2, each detection assigned to the bin in the several detections is identified as being caused by the interfering signal based upon the number of detections assigned to the bin in the velocity-direction histogram for the detection window.

(A4) In some embodiments of any of the methods of A1-A3, identifying the detection as being caused by the interfering signal comprises computing the number of the detections assigned to the bin in the velocity-direction histogram. Identifying the detection as being caused by the interfering signal further comprises determining that the number of the detections exceeds a threshold, wherein the detection is identified as being caused by the interfering signal based upon the number of the detections exceeding the threshold.

(A5) In some embodiments of the method of A4, identifying the detection as being caused by the interfering signal further comprises: a) computing the number of the detections assigned to the bin in the velocity-direction histogram; b) computing, for bins in the velocity-direction histogram that are immediately adjacent to the bin in the velocity-direction histogram, respective numbers of detections; c) selecting, from the bins that are immediately adjacent to the bin, a subset of bins; d) determining a number of detections in the subset of the bins; and e) computing a difference between the number of the detections assigned to the bin in the velocity-direction histogram and the number of detections in the subset of the bins, wherein the detection is identified as being caused by the interfering signal based upon the difference between the number of detections assigned to the bin and the number of detections in the subset of the bins.

(A6) In some embodiments of the method of A5, identifying the detection as being caused by the interfering signal further comprises: f) determining that the difference between the number of the detections assigned to the bin in the velocity-direction histogram and the number of detections in the subset of the bins exceeds a second threshold, wherein the detection is identified as being caused by the interfering signal based upon the difference between the number of the detections assigned to the bin and the number of detections in the subset of the bins exceeding the second threshold.

(A7) In some embodiments of the any of the methods of A5-A6, each detection assigned to the bin is identified as being caused by the interfering signal, and wherein the output data fails to include each detection assigned to the bin.

(A8) In some embodiments of any of the methods of A5-A7, the method further includes identifying that a second detection is caused by the interfering signal, wherein the second detection is assigned to a second bin in the bins that is immediately adjacent to the bin, wherein identifying that the second detection is caused by the interfering signal comprises: a) selecting, from the bins that are immediately adjacent to the bin, a second subset of bins; b) determining a number of detections in the second subset of the bins; c) comparing the number of detections in the second subset of the bins to a second threshold; and d) determining that the number of detections in the second subset of the bins is beneath the second threshold, wherein the second detection is identified as being caused by the interfering signal based upon the number of detections in the second subset of the bins being beneath the second threshold.

(A9) In some embodiments of the method of A8, each detection in each bin that is immediately adjacent to the bin is labeled as being caused by the interfering signal based upon the number of detections in the second subset of the bins being beneath the second threshold.

(A10) In some embodiments of any of the methods of A1-A9, a computing system is in communication with the radar system, wherein the computing system is configured to identify an object in the scene based the output data.

(B1) In another aspect, some embodiments include a method performed by a radar system of an AV. The method includes receiving a signal in a scene and based upon the received signal and a frequency modulated continuous wave (FMCW) local oscillator, generating a detection within a temporal detection window, wherein the detection is assigned a velocity value and a direction value. The method also includes assigning the detection to a bin in a velocity-direction histogram for the temporal detection window based upon the velocity value and the direction value assigned to the detection, wherein the velocity-direction histogram includes several bins. The method additionally includes determining a number of detections in the bin and based upon the number of detections in the bin, identifying that the signal was emitted by an interferer. The method additionally includes subsequent to identifying that the signal was emitted by the interferer, generating output data that includes detections in the temporal detection window, wherein the detections fail to include the detection due to the signal being identified as being emitted by the interferer, and further wherein the AV performs a driving maneuver based upon the output data.

(B2) In some embodiments of the method of B1, the method further includes determining that the number of detections in the bin is greater than a predefined threshold, wherein the signal is identified as being emitted by the interferer based upon the number of detections in the bin being determined as being greater than the predefined threshold.

(B3) In some embodiments of any of the methods of B1-B2, the bin includes several detections that are assigned to the bin, wherein the several detections are assigned the velocity value and the direction value, wherein the several detections are identified as being caused by the signal that was emitted by the interferer, and further wherein the output data fails to include the several detections.

(B4) In some embodiments of any of the methods of B1-B3, the method further includes determining a number of detections in a second bin in the several bins for the temporal time window, wherein the signal is identified as being emitted by the interferer based upon the number of detections in the second bin.

(B5) In some embodiments of any of the methods of B1-B4, the method also includes: a) defining, in the velocity-direction histogram, bins as being neighbor bins to the bin in the velocity-direction histogram; b) determining a number of detections in a subset of bins in the neighbor bins; and c) computing a difference between the number of detections in the subset of the bins and the number of detections in the bin, wherein the signal is identified as being emitted by the interferer based upon the difference between the number of detections in the subset of the bins and the number of detections in the bin.

(B6) In some embodiments of the method of B5, the method also includes determining that the difference between the number of detections in the subset of the bins and the number of detections in the bin is greater than a threshold, wherein the signal is identified as being emitted by the interferer based upon the difference between the number of detections in the subset of the bins and the number of detections in the bin being greater than the threshold.

(C1) In another aspect, some embodiments include a method performed by a radar system that includes an antenna that is configured to detect a radar signal and processing circuitry. The method includes computing, for a temporal detection window and based upon the radar signal: a velocity for a detection in a scene; and a direction of the detection relative to the radar system. The method also includes generating a velocity-direction histogram for the detection window, wherein the velocity-direction histogram comprises bins, and further wherein the detection is assigned to a bin in the bins based upon the velocity assigned to the detection and the direction of the detection relative to the radar system. The method also includes identifying the detection as being caused by an interferer based upon a number of detections assigned to the bin in the velocity-direction histogram for the detection window. The method additionally includes generating, based upon the radar signal, output data that identifies detections in the scene, wherein the detections identified in the output data fail to include the detection identified as being caused by the interferer.

(C2) In some embodiments of the method of C1, an AV has the radar system attached thereto, wherein the AV performs a driving maneuver based upon the output data.

(C3) In some embodiments of any of the methods of C1-C2, a transmitter is configured to transmit a frequency-modulated continuous wave (FMCW) signal, wherein the output data is based further upon the FMCW signal.

(C4) In some embodiments of the method of C3, velocities and directions are computed for several detections in the temporal detection window based upon the FMCW signal, wherein the several detections are assigned to respective bins in the velocity-direction histogram for the detection window, and further wherein each detection assigned to the bin in the several detections is identified as being caused by the interferer based upon the number of detections assigned to the bin in the velocity-direction histogram for the detection window.

(D1) In another aspect, some embodiments include an AV that comprises a radar system that comprises processing circuitry, where the processing circuitry is configured to perform one or more of the methods described herein (e.g., any of A1-A10, B1-B6, and C1-C4).

(E1) In yet another aspect, some embodiments include a radar system that comprises processing circuitry, where the processing circuitry is configured to perform one or more of the methods described herein (e.g., any of A1-A10, B1-B6, and C1-C4).

(F1) In still yet another aspect, some embodiments include a radar system that comprises an antenna that is configured to detect a radar signal. The radar system further includes processing circuitry, where the processing circuitry is configured to perform one or more of the methods described herein (e.g., any of A1-A10, B1-B6, and C1-C4).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:
1. An autonomous vehicle (AV) comprising:
a radar system that comprises processing circuitry, the processing circuitry configured to perform acts comprising:
computing, for a temporal detection window and based upon a frequency-modulated continuous wave (FMCW) signal emitted by the radar system:

a velocity for a detection in a scene; and
a direction of the detection relative to the radar system;
generating a velocity-direction histogram for the detection window, wherein the velocity-direction histogram comprises bins, and further wherein the detection is assigned to a bin in the bins based upon:
the velocity assigned to the detection; and
the direction of the detection relative to the radar system;
identifying the detection as being caused by an interfering signal based upon a number of detections assigned to the bin in the velocity-direction histogram for the detection window; and
generating, based upon the FMCW signal, output data that identifies detections in the scene, wherein the detections identified in the output data fail to include the detection identified as being caused by the interfering signal, wherein the AV performs a driving maneuver based upon the output data.

2. The AV of claim 1, wherein velocities and directions are computed for several detections in the temporal detection window based upon the FMCW signal, wherein the several detections are assigned to respective bins in the velocity-direction histogram for the temporal detection window.

3. The AV of claim 2, wherein the bin in the several bins has multiple detections assigned thereto, and further wherein each detection in the multiple detections assigned to the bin is identified as being caused by the interfering signal based upon the number of detections assigned to the bin in the velocity-direction histogram for the detection window.

4. The AV of claim 1, wherein identifying the detection as being caused by the interfering signal comprises:
computing the number of the detections assigned to the bin in the velocity-direction histogram; and
determining that the number of the detections exceeds a threshold, wherein the detection is identified as being caused by the interfering signal based upon the number of the detections exceeding the threshold.

5. The AV of claim 4, wherein identifying the detection as being caused by the interfering signal further comprises:
computing the number of the detections assigned to the bin in the velocity-direction histogram;
computing, for bins in the velocity-direction histogram that are immediately adjacent to the bin in the velocity-direction histogram, respective numbers of detections;
selecting, from the bins that are immediately adjacent to the bin, a subset of bins;
determining a number of detections in the subset of the bins; and
computing a difference between the number of the detections assigned to the bin in the velocity-direction histogram and the number of detections in the subset of the bins, wherein the detection is identified as being caused by the interfering signal based upon the difference between the number of detections assigned to the bin and the number of detections in the subset of the bins.

6. The AV of claim 5, wherein identifying the detection as being caused by the interfering signal further comprises:
determining that the difference between the number of the detections assigned to the bin in the velocity-direction histogram and the number of detections in the subset of the bins exceeds a second threshold, wherein the detection is identified as being caused by the interfering signal based upon the difference between the number of the detections assigned to the bin and the number of detections in the subset of the bins exceeding the second threshold.

7. The AV of claim 5, wherein each detection assigned to the bin is identified as being caused by the interfering signal, and wherein the output data fails to include each detection assigned to the bin.

8. The AV of claim 5, the acts further comprising identifying that a second detection is caused by the interfering signal, wherein the second detection is assigned to a second bin in the bins that is immediately adjacent to the bin, wherein identifying that the second detection is caused by the interfering signal comprises:
selecting, from the bins that are immediately adjacent to the bin, a second subset of bins;
determining a number of detections in the second subset of the bins;
comparing the number of detections in the second subset of the bins to a second threshold; and
determining that the number of detections in the second subset of the bins is beneath the second threshold, wherein the second detection is identified as being caused by the interfering signal based upon the number of detections in the second subset of the bins being beneath the second threshold.

9. The AV of claim 8, wherein each detection in each bin that is immediately adjacent to the bin is labeled as being caused by the interfering signal based upon the number of detections in the second subset of the bins being beneath the second threshold.

10. The AV of claim 1, further comprising a computing system that is in communication with the radar system, wherein the computing system is configured to identify an object in the scene based the output data.

11. A method performed by a radar system of an autonomous vehicle (AV), the method comprising:
receiving a signal in a scene;
based upon the received signal and a frequency modulated continuous wave (FMCW) local oscillator, generating a detection within a temporal detection window, wherein the detection is assigned a velocity value and a direction value;
assigning the detection to a bin in a velocity-direction histogram for the temporal detection window based upon the velocity value and the direction value assigned to the detection, wherein the velocity-direction histogram includes several bins;
determining a number of detections in the bin;
based upon the number of detections in the bin, identifying that the signal was emitted by an interferer; and
subsequent to identifying that the signal was emitted by the interferer, generating output data that includes detections in the temporal detection window, wherein the detections fail to include the detection due to the signal being identified as being emitted by the interferer, and further wherein the AV performs a driving maneuver based upon the output data.

12. The method of claim 11, further comprising:
determining that the number of detections in the bin is greater than a predefined threshold, wherein the signal is identified as being emitted by the interferer based upon the number of detections in the bin being determined as being greater than the predefined threshold.

13. The method of claim 11, wherein the bin includes several detections that are assigned to the bin, wherein the several detections are assigned the velocity value and the direction value, wherein the several detections are identified as being caused by the signal that was emitted by the interferer, and further wherein the output data fails to include the several detections.

14. The method of claim 11, further comprising:
   determining a number of detections in a second bin in the several bins for the temporal time window, wherein the signal is identified as being emitted by the interferer based upon the number of detections in the second bin.

15. The method of claim 14, further comprising:
   defining, in the velocity-direction histogram, bins as being neighbor bins to the bin in the velocity-direction histogram;
   determining a number of detections in a subset of bins in the neighbor bins; and
   computing a difference between the number of detections in the subset of the bins and the number of detections in the bin, wherein the signal is identified as being emitted by the interferer based upon the difference between the number of detections in the subset of the bins and the number of detections in the bin.

16. The method of claim 15, the method further comprising:
   determining that the difference between the number of detections in the subset of the bins and the number of detections in the bin is greater than a threshold, wherein the signal is identified as being emitted by the interferer based upon the difference between the number of detections in the subset of the bins and the number of detections in the bin being greater than the threshold.

17. A radar system comprising:
   an antenna that is configured to detect a radar signal; and
   processing circuitry, the processing circuitry configured to perform acts comprising:
      computing, for a temporal detection window and based upon the radar signal:
         a velocity for a detection in a scene; and
         a direction of the detection relative to the radar system;
      generating a velocity-direction histogram for the detection window, wherein the velocity-direction histogram comprises bins, and further wherein the detection is assigned to a bin in the bins based upon:
         the velocity assigned to the detection; and
         the direction of the detection relative to the radar system;
      identifying the detection as being caused by an interferer based upon a number of detections assigned to the bin in the velocity-direction histogram for the detection window; and
      generating, based upon the radar signal, output data that identifies detections in the scene, wherein the detections identified in the output data fail to include the detection identified as being caused by the interferer.

18. The radar system of claim 17, wherein an autonomous vehicle (AV) has the radar system attached thereto, and further wherein the AV performs a driving maneuver based upon the output data.

19. The radar system of claim 17, further comprising a transmitter that is configured to transmit a frequency-modulated continuous wave (FMCW) signal, wherein the output data is based further upon the FMCW signal.

20. The radar system of claim 19, wherein velocities and directions are computed for several detections in the temporal detection window based upon the FMCW signal, wherein the several detections are assigned to respective bins in the velocity-direction histogram for the detection window, and further wherein each detection assigned to the bin in the several detections is identified as being caused by the interferer based upon the number of detections assigned to the bin in the velocity-direction histogram for the detection window.

* * * * *